United States Patent
McDaniel et al.

(10) Patent No.: US 6,252,232 B1
(45) Date of Patent: Jun. 26, 2001

(54) DIGITAL INTEGRATOR

(75) Inventors: David L. McDaniel, Dousman; Floribertus Heukensfeldt Jansen, Brookfield, both of WI (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/106,588

(22) Filed: Jun. 29, 1998

(51) Int. Cl.[7] .................................................. G01T 1/164
(52) U.S. Cl. ................ 250/369; 250/363.02; 250/390.01
(58) Field of Search ............................ 250/369, 363.02, 250/390.01

(56) References Cited

U.S. PATENT DOCUMENTS

| 5,241,181 | 8/1993 | Mertens et al. |
| 5,272,343 | 12/1993 | Stearns. |
| 5,309,357 | * | 5/1994 | Stark et al. ..................... 250/363.02 |
| 5,378,893 | 1/1995 | Murray et al. |
| 5,495,106 | * | 2/1996 | Mastny ........................... 250/390.01 |

* cited by examiner

Primary Examiner—Constantine Hannaher
Assistant Examiner—Andrew Israel
(74) Attorney, Agent, or Firm—Armstrong Teasdale LLP; Christian G. Cabou (57) ABSTRACT

A detector including opposed detector heads having anode signal processors which perform a sliding box car integration of each PMT anode signal, corrects for baseline shifts and pileup from the tails of previous events, vary the length of the box car based on the time between events, and use a peak detection circuit to reduce the dependence of the integrated value on timing differences between the asynchronous events and the synchronous ADC conversion is described. The outputs of anode processors are combined to provide the X and Y coordinates, and the energy E, of an event. The outputs from each head processor are then combined in a coincidence processor to provide the corrected positions and energies of coincidence events. The above described detector heads function at a high count rate with minimum dead time and pileup.

36 Claims, 6 Drawing Sheets

DIGITAL INTEGRATOR

FIELD OF THE INVENTION

This invention relates generally to imaging and, more particularly, to emissions tomography imaging.

BACKGROUND OF THE INVENTION

The signal processing described herein is primarily described in the context of emission tomography medical imaging. The processing, however, can be utilized in connection with many other types of scintillation systems (e.g., well logging systems). Therefore, the discussion regarding medical imaging describes, by way of example, one of the many modalities in which the signal processing may be implemented.

One known type of emission tomography medical imaging is generally known as positron emission tomography (PET). PET scanners are utilized to generate images of, for example, portions of a patient's body. Positron annihilation events are utilized in generating such images. Positrons (a positron is the antiparticle of the electron) are emitted by radionuclides prepared using a cyclotron or other device. The radionuclides are employed as radioactive tracers called "radiopharmaceuticals" by incorporating them into substances, such as glucose or carbon dioxide.

The radiopharmaceuticals are injected into the patient and become involved in such processes as blood flow, fatty acids, glucose metabolism, and synthesis. Positrons are emitted as the radionuclides decay. The positrons travel a very short distance before encountering an electron, and when that occurs, the position and electron annihilate emitting two photons directed in nearly opposite directions.

In some known PET scanners, two detector heads located one hundred and eighty degrees apart rotate around a patient. Each detector head includes crystals, referred to as scintillators, to convert the energy of each 511 keV photon into a flash of light that is sensed by a photomultiplier tube (PMT). Coincidence detection circuits connect to the detectors and record only those photons that are detected simultaneously by the detector. The number of such simultaneous events indicates the number of positron annihilations that occurred along a line joining the two opposing detectors.

During a scan, hundreds of millions of events are detected and recorded to indicate the number of annihilation events along lines joining pairs of detectors in the ring. The collected data is used to reconstruct an image. Further details regarding PET scanners are set forth in U.S. Pat. Nos. 5,378,893, 5,272,343, and 5,241,181, all of which are assigned to the present assignee.

Generally, by maximizing the count rate (i.e., the number of detected events), the performance of the imaging system is enhanced. The anode signals from the PMTs must be processed to provide a good measurement of the integrated signal strength. Two known methods typically are utilized for processing the anode signals. In one method, the signal pulse is shaped by a filter (RC-CR, Gaussian, etc.), and the peak value of the shaped pulse is then digitized. The pulse shaping method provides the advantage of low noise and produces an output without the necessity of a trigger circuit. However, the shaped pulse is wide and the pile up of the filtered/shaped pulses limits the usefulness of the circuit at high count rates.

The other known method is referred to as a switching integrator method. Specifically, a timing pickoff circuit is used to detect the leading edge of the signal pulse. The output of the timing pickoff circuit then initiates operation of an integrator (either analog or digital) which integrates the signal pulse. The switching integrator method does not require that the pulse be broadened (filtered). Therefore, this method is less affected by pileup at high count rates. However, the circuit does not produce an output unless a trigger was detected and the circuit is dead during the integration, which adversely impacts the count rate.

To reduce the effect of the dead time of the integrator on the overall system dead time, multiple integrators can be used on each signal. If a pulse is detected while one integrator is processing an event, the anode signal is switched to another integrator which is not in use. The integration of the first pulse can be stopped when a second pulse is detected and output of the integrator corrected for the shorter integration time. The output value from the first integrator can be used to correct the output value of the second integrator for the contribution from the pileup of the first pulse with the second pulse.

Operating a nuclear camera in a 511 keV coincidence detection mode requires that the detector heads function at as high a count rate as possible with minimum dead time and pileup. It would therefore be desirable to combine the advantages of the pulse shaping method (i.e., continuous output and minimum dead time) with the advantages of the integrator method (i.e, minimum pileup and the ability to easily correct pileup between pulses).

SUMMARY OF THE INVENTION

These and other objects may be attained by a detector including opposed detector heads having anode signal processors constructed in accordance with the present invention. More particularly, each detector head includes a scintillator and a plurality of photomultiplier tubes (PMTs) positioned adjacent the scintillator. Each PMT output is coupled to a pre-amplifier, and the pre-amplifier output is coupled to both an anode signal processor and an event processing unit. The event processor unit combines the signals from all the PMT anodes and generates a time stamp, a baseline enable, an event trigger, and an event select signal.

The anode signal processor, as described below in more detail, performs a sliding box car integration of each PMT anode signal, corrects for baseline shifts and pileup from the tails of previous events, varies the length of the box car based on the time between events, and uses a peak detection circuit to reduce the dependence of the integrated value on timing differences between the asynchronous events and the synchronous ADC conversion. The outputs of anode processors are combined to provide the X and Y coordinates, and the energy E, of an event. The outputs from each head processor are then combined in a coincidence processor to provide the corrected positions and energies of coincidence events. The above described detector heads function at a high count rate with minimum dead time and pileup.

DETAILED DESCRIPTION

Figure 1:
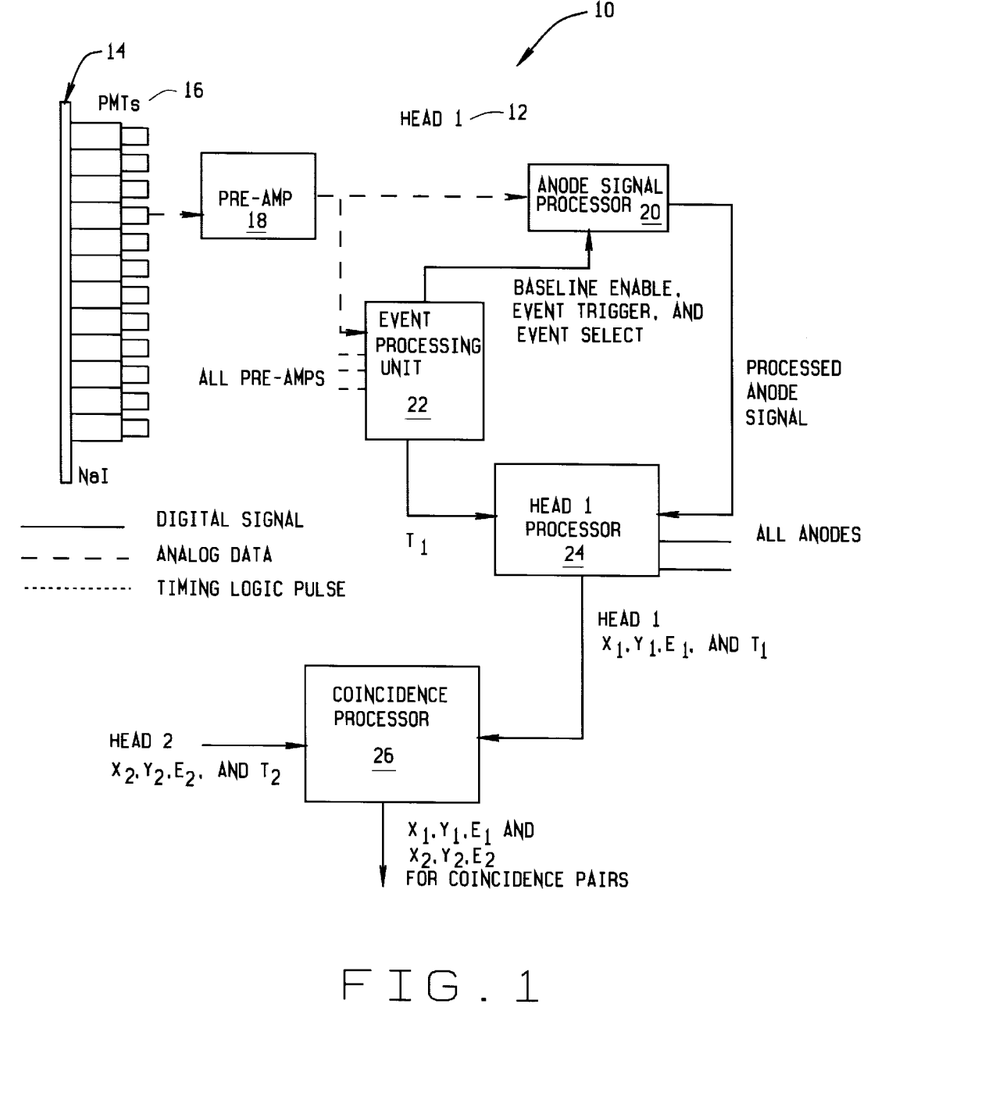
FIG. 1 is a block diagram of an exemplary system configured in accordance with one embodiment of the present invention.

FIG. 1 is a block diagram of an exemplary system 10 configured in accordance with one embodiment of the present invention. In FIG. 1, solid lines correspond to digital signals, dashed lines correspond to analog data, and dotted lines correspond to timing logic pulse signals. As shown in FIG. 1, detector 10 includes a first detector head 12. It should be understood that detector 10 includes a second detector head (not shown) identical to first detector head 12. The second head is positioned one hundred and eighty degrees from first detector head 12.

First detector head 12 includes a scintillator 14 and a plurality of photomultiplier tubes 16 positioned adjacent scintillator 14. Each PMT output is coupled to a pre-amplifier 18, and the pre-amplifier output is coupled to both an anode signal processor 20 and an event processing unit 22. Event processing unit 22 combines the signals from all the PMT anodes and generates the following digital signals.

Time Stamp: Digital value representing the time of the occurrence of the event.

Baseline Enable: Logic signal sent to anode signal processors when no events have occurred in the previous T seconds. T is chosen to be several times the decay time of the light from the crystal.

Event Trigger: Logic signal sent to the appropriate anode signal processors when an event is detected.

Event Select: Logic signal sent to an anode signal processor when a valid event has occurred and the output of the anode signal processor is needed to process the event.

Anode signal processor 20, as described below in more detail, performs a sliding box car integration of the anode signal, corrects for baseline shifts, corrects for pileup from the tails of previous events, varies the length of the box car based on the time between events, and uses a peak detection circuit to reduce the dependence of the integrated value on timing differences between the asynchronous events and the synchronous ADC conversion.

The outputs of anode processors 20 are combined in head 1 processor 24 to provide the X and Y coordinates, and the energy E, of an event. The outputs from each head processor are then combined in a coincidence processor 26 to provide the corrected positions and energies of coincidence events.

Figure 2:
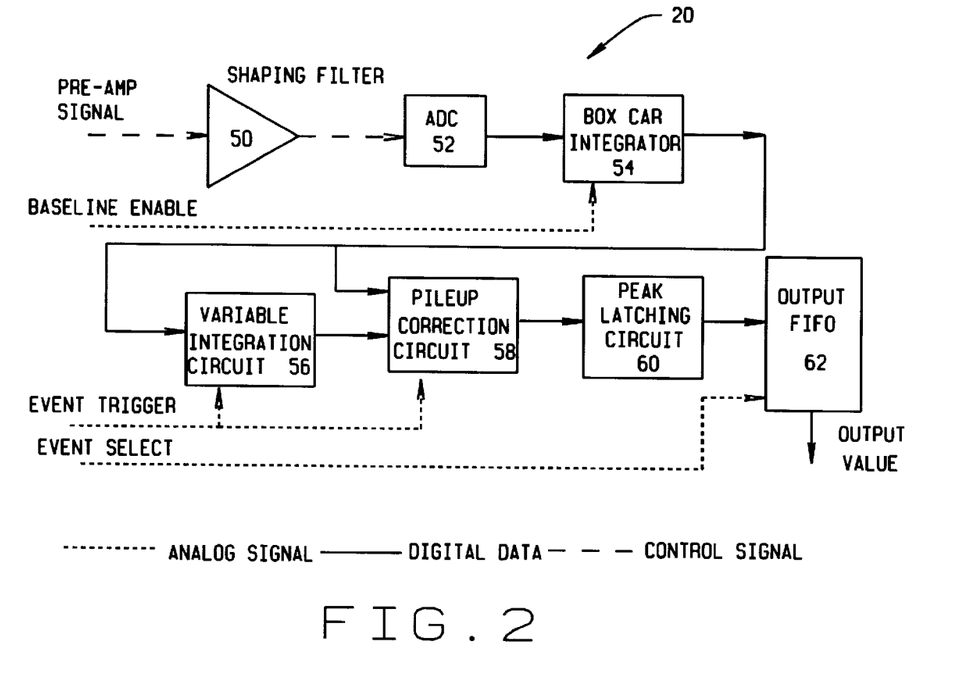
FIG. 2 is a block diagram of an exemplary embodiment of anode signal processor.

FIG. 2 is a block diagram of an exemplary embodiment of anode signal processor 20. In FIG. 2 and the following figures, dotted lines correspond to analog signals, solid lines correspond to digital data, and dashed lines correspond to control signals. Processor 20 includes a shaping filter 50 for shaping a signal received from pre-amplifier 18, and an analog to digital converter (ADC) 52 which converts the analog signal output by shaping filter 50 to a digital signal. Processor 20 further includes a box car integrator 54 for producing a sliding box car integral of the digital signal with baseline restoration, and a variable integration circuit 56 that receives the output of box car integrator 54 and forms an output from multiple integration times and selects the longest integration time for which there is no pileup. Processor 20 also includes a pileup correction circuit 58 that uses the output of box car integrator 54 to correct the signal from variable integration circuit 56 for the pile up from events that occurred before the start of the integral, and a peak latching circuit 60 that reduces the error from synchronously sampling an asynchronous signal. The output of peak latching circuit 60 is provided to a first-in first-out (FIFO) circuit 62 which generates an output value.

Each of the components of processor 20 are described below in more detail. In the block diagrams that follow, the functional units (adders, switches, accumulators, etc.) are handled as if such units have zero propagation delay. When implemented in practice, however, the circuits need to take into account the actual propagation delays, as is known in the art.

Figure 3:
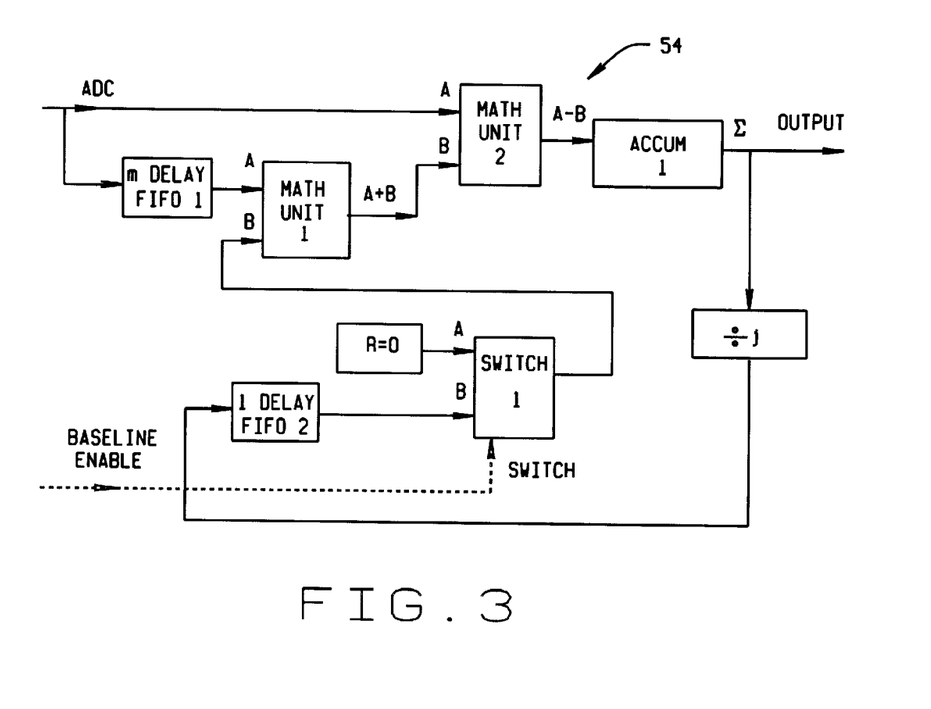
FIG. 3 is a block diagram of an exemplary embodiment of a sliding box car integrator with a baseline restore circuit.
Figure 5:
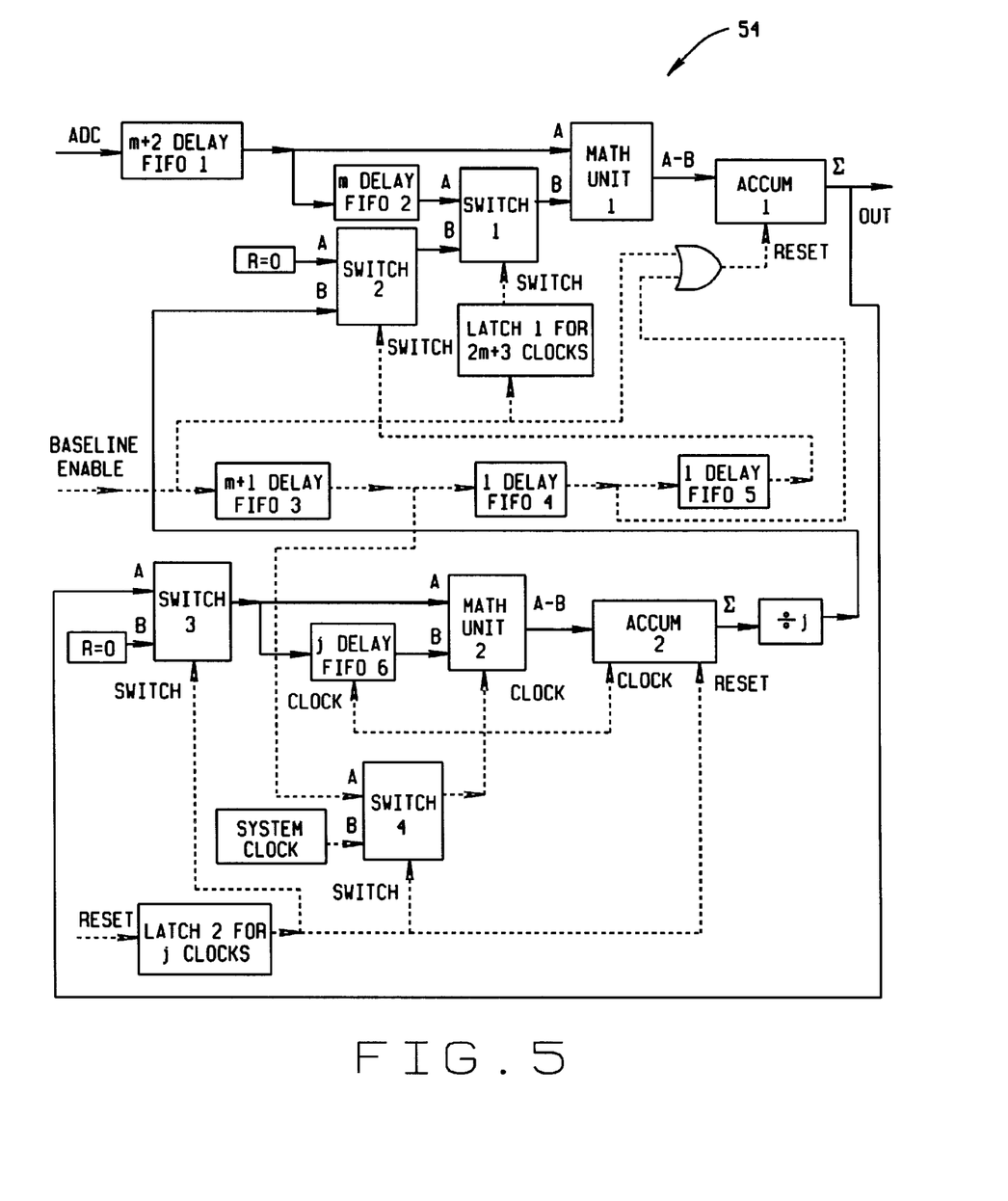
FIG. 5 is a block diagram of another exemplary embodiment of a sliding box car integrator with a baseline restore circuit.

FIGS. 3 and 5 illustrate alternative exemplary embodiments of sliding box car integrator 54 with baseline restore circuit. The embodiments differ in the manner of baseline restoration. The embodiment shown in FIG. 3 is simpler than the embodiment shown in FIG. 5 but is more sensitive to the noise of the baseline measurements and will not correct for baseline shifts smaller than the size of divider (j). The embodiment shown in FIG. 5 is less sensitive to the noise of a single baseline measurement and corrects baseline shifts of 1 LSB or greater but is more complex. If the accuracy produced by the embodiment shown in FIG. 3 is sufficient for the particular application, then that embodiment should be used. If greater accuracy is required, then the embodiment shown in FIG. 5 should be used.

Generally, the accuracy of the output of processor 20 can be improved by shifting the output of ADC 52 (FIG. 2) up by L bits (multiplying the value by $2^L$) and shifting the output of processor 20 down by L bits (dividing by $2^L$). The maximum baseline error on the output of ADC 52 that will not be corrected is then $(j-1)/(2^L)$.

Referring now specifically to FIG. 3, integrator 54 includes math units 1 and 2. An m delay FIFO 1 is coupled to an input of math unit 1, and the output of math unit 1 is input to math unit 2. The output of math unit 2 is supplied to accumulator 1. The output of accumulator 1 is fed back through a divider, and divider is coupled to a 1 delay FIFO 2. The output of 1 delay FIFO 2 is provided to switch 1 having another input of R=0. A baseline enable signal is used to trigger switch 1, and the output of switch 1 is supplied as an input to math unit 1.

Integrator 54 has two modes of operations. Particularly, integrator 54 has a normal mode in which the input signal is integrated, and a baseline sampling mode in which the baseline correction is updated. In the normal mode, the baseline enable signal is FALSE, switch 1 is set to pass input A (a value of zero), and the output of math unit 1 is equal to the output of FIFO 1.

TABLE I

Standard Operation (baseline enable = false) for the $i^{th}$ Clock cycle

| UNIT | INPUTs | OUTPUT |
|---|---|---|
| ADC | analog signal | $ADC_i$ |
| FIFO 1 | $ADC_i$ | $ADC_{i-m}$ |
| SWITCH 1 | 0    $[I_{i-1}]/j$ | 0 |
| MATH UNIT 1 | $ADC_{i-m}$   0 | $ADC_{i-m}$ |
| MATH UNIT 2 | $ADC_i$   $ADC_{i-m}$ | $[ADC_i - ADC_{i-m}]$ |

TABLE I-continued

Standard Operation (baseline enable = false) for the $i^{th}$ Clock cycle

| UNIT | INPUTs | OUTPUT |
| --- | --- | --- |
| ACCUM 1 | [$ADC_i - ADC_{i-m}$] | $I_i$ |
| Divider (shift) | $I_i$ | [$I_i$]/j |
| FIFO 2 | $I_i$/j | [$I_{i-1}$]/j |

$I_i$ = (integral − baseline correction = $\Sigma_{n=i-m,i}[ADC_n]$) − (baseline correction stored in ACCUM 1)

Table I gives the input and output values of the functional units on clock cycle i.

In the baseline sampling mode (baseline enable signal TRUE for one clock cycle), switch 1 is set to pass input B (previous output of the accumulator divided by j). Since the baseline enable is set TRUE only when there are no events in the last W clock cycles (W>>m), the output of accumulator is equal to the difference between the baseline and the baseline correction stored in accumulator.

Figure 4:
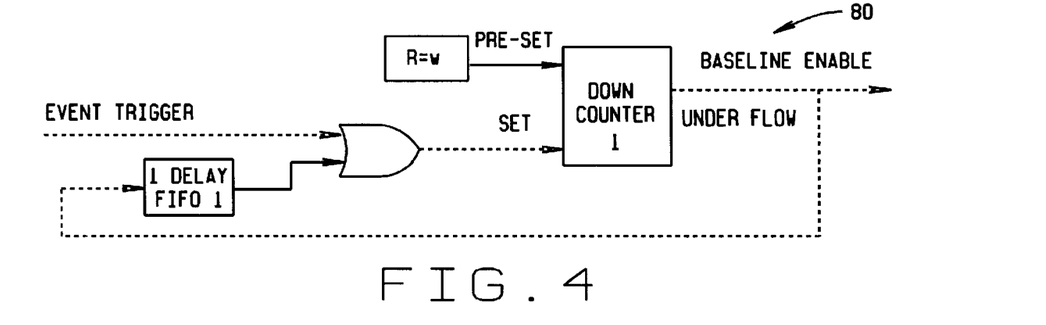
FIG. 4 is a block diagram of a circuit which generates the baseline enable signal from the event trigger signal.

FIG. 4 is a block diagram of a circuit 80 which generates the baseline enable signal from the event trigger signal. Circuit 80 includes down counter 1 and FIFO 1. Down counter 1 is coupled to receive an input from a logic gate coupled to delay FIFO 1 and event trigger. Down counter 1 also receives an input preset to R=w.

unit 1. An m delay FIFO 2 supplies an input to switch 1. FIFOs 3, 4, and 5 supply a baseline enable to switch 2. An output from FIFO 4 also is supplied to an OR gate along with the baseline enable signal to reset accumulator 1. A latch receives the baseline enable signal and output an enable signal to switch 1.

Additional components in the lower portion of integrator include a j delay FIFO 6 which supplies an input to math unit 2, a system clock which supplies an input to switch 4, and a latch which supplies a reset signal to accumulator 2, a switch signal to switch 3, and a switch signal to switch 4. A divide by j component receives the output from accumulator 2 and supplies the divided signal to switch 2.

Integrator 54 has three modes of operations. Generally, in the normal mode, integrator integrates the input signal. In a baseline sampling mode, integrator updates the baseline correction. In an initialization mode, typically used on power up, the FIFOs and accumulators are initialized. Each mode of operation is described below in more detail.

Initialization Mode

The initialization mode begins when the input on the reset line becomes TRUE. Latch 2 on the reset line then outputs a value of TRUE for the next j clock cycles. During this period the circuit:

1) Sets Switch 3 to input B (zero sent to the input to FIFO 6).

2) Sets Switch 4 to input B (system clock used to clock FIFO 6, MATH UNIT 2, and ACCUM 2).

TABLE II

Updating Baseline Correction (baseline enable$_i$ = true) for the $i^{th}$ Clock Cycle

| UNIT | INPUTs | OUTPUT |
| --- | --- | --- |
| ADC | analog signal | $ADC_i$ |
| FIFO 1 | $ADC_i$ | $ADC_{i-m}$ |
| Divider (shift) | $I_i$ | [$I_i$]/j |
| FIFO 2 | $I_i$/j | [$I_{i-1}$]/j = [$E_{i-1}$]/j = (error in correction)/j |
| SWITCH 1 | 0    [$E_{i-1}$]/j | [$E_{i-1}$]/j |
| MATH UNIT 1 | $ADC_{i-m}$  [$E_{i-1}$]/j | $ADC_{i-m}$ + [$E_{i-1}$]/j |
| MATH UNIT 2 | $ADC_i$    $ADC_{i-m}$ + [$E_{i-1}$]/j | [$ADC_i - [ADC_{i-m} + E_{i-1}/j]$] |
| ACCUM 1 | $ADC_i - ADC_{i-m} - [E_{i-1}]/j$ | $I_i = \sum_{n=i-m,i}[ADC_n] - \binom{\text{baseline correction stored}}{\text{in ACCUM1}}[E_{i-1}]/j$ |

$E_i$ = (ERROR in Correction)
  = (baseline measurement) − (baseline correction stored in the accumulator)
  = $\Sigma_{n=i-1-m,i}[ADC_n]$ − (baseline correction stored in ACCUM1)

Table II provides the inputs and outputs of the functional units when integrator 54 is updating the baseline correction on the $i^{th}$ clock cycle. After the $i^{th}$ clock cycle, the new baseline correction stored in the accumulator is:

(new baseline correction)−(j−1)j*(old baseline correction)+(1/j)* (new baseline measurements).

The integrator does not require initialization. After a sufficient number of baseline enable pulses, the accumulator contains a valid baseline correction independent of the values in the FIFOs and accumulator on power up.

Referring now to FIG. 5, another embodiment of integrator 54 is illustrated. In this embodiment, the upper portion of integrator 54 is a sliding box car integrator and the lower portion of integrator 54 forms a running average of the last j measurements of the baseline. Integrator 54 includes math units 1 and 2, switches 1, 2, 3, and 4, and accumulators 1 and 2. Additional components in the box car integrator portion of integrator 54 include an m+2 delay FIFO 1 which receives a digital output from ADC 52 and supplies an input to math 3) Resets ACCUM 2 to a value of zero.

After the completion of the initialization mode (j+1 clock cycles after the reset signal became TRUE), FIFO 6 will contain zero in all its locations, and ACCUM 2 will contain zero, and switches 3 and 4 will be set to input A.

Normal Mode

In the normal mode (reset and baseline enable both FALSE for more than 2M+1 clock cycles), switches 1, 2, 3 and 4 are set to input A.

TABLE III

Standard Operation
(baseline enable = false and reset = false) for the $i^{th}$ Clock Cycle

| UNIT | INPUTs | OUTPUT |
| --- | --- | --- |
| ADC | analog signal | $ADC_i$ |
| FIFO 1 | $ADC_i$ | $ADC_{i-m-2}$ |
| FIFO 2 | $ADC_{i-m-2}$ | $ADC_{i-2m-2}$ |
| SWITCH 1 | $ADC_{i-2m-2}$   0 | $ADC_{i-2m-2}$ |

TABLE III-continued

Standard Operation
(baseline enable = false and reset = false) for the $i^{th}$ Clock Cycle

| UNIT | INPUTs | OUTPUT |
|---|---|---|
| SWITCH 2 | 0 (average baseline correction) | 0 |
| MATH UNIT 1 | $ADC_{i-m-2}$  $ADC_{i-2m-2}$ | $[ADC_{i-m-2} - ADC_{i-2m-2}]$ |
| ACCUM 1 | $[ADC_{i-m-2} - ADC_{i-2m-2}]$ | $I_{i-m-2}$ |

$I_i$ = (integral − baseline correction) = $\Sigma_{n=i-m,i}[ADC_n]$ − (baseline correction stored in ACCUM1)

Table III provides the input and output values of the functional units on clock cycle i.

Baseline Sampling Mode

The baseline sampling mode begins when the input on the reset line is FALSE and the input on the baseline enable line becomes TRUE. The circuit uses the next m+3 clock cycles after the baseline enable becomes TRUE to measure and update the baseline correction. The baseline enable line must stay TRUE for only one clock cycle and false for 2m+3 clock cycles for a valid measurement and update of the baseline to occur. The output of ACCUM 1 will contain a valid integration value 2m+2 clock cycles after the baseline enable became TRUE. The baseline sampling mode is more complex than the previously described modes. The various stages of the baseline sampling mode are described in Tables IV, V, VI, VII, VIII, and IX.

TABLE IV

Updating Baseline Correction (baseline enable = true on clock cycle i)
Stage 1 Clock Cycle i

| UNIT | INPUTs | OUTPUT |
|---|---|---|
| Latch 1 | TRUE | TRUE |
| SWITCH 1 | $ADC_{i-2m-2}$  0 | 0 |
| SWITCH 2 | 0 (last baseline correction) | 0 |
| ACCUM 1 | $ADC_{i-m-2}$ | 0 (reset) |
| FIFO 3 | TRUE | FALSE |

TABLE V

Updating Baseline Correction (baseline enable = true on clock cycle i)
Stage 2 Clock Cycle g (for g between i + 1 and i + m)

| UNIT | INPUTs | OUTPUT |
|---|---|---|
| Latch 1 | False | TRUE |
| SWITCH 1 | $ADC_{g-2m-2}$  0 | 0 |
| SWITCH 2 | 0 (last baseline correction) | 0 |
| MATH UNIT 1 | $ADC_{g-m-2}$  0 | $[ADC_{g-m-2} - 0]$ |
| ACCUM 1 | $ADC_{g-m-2}$ | $\Sigma_{n=i-2m-1,g-m-2}[ADC_n]$ |

TABLE VI

Updating Baseline Correction (baseline enable = true on clock cycle i)
Stage 3 Clock Cycle i + m + 1

| UNIT | INPUTs | OUTPUT |
|---|---|---|
| Latch 1 | FALSE | TRUE |
| SWITCH 1 | $ADC_{i-1}$  0 | 0 |
| SWITCH 2 | 0 and $S_k/j$ | 0 |
| MATH UNIT 1 | $ADC_{i-1}$  0 | $[ADC_{i-1} - 0]$ |
| ACCUM 1 | $ADC_{i-1}$  0 | $B_k$ (new base line measurement) |
| FIFO 3 | FALSE | TRUE |
| FIFO 4 | TRUE | FALSE |

TABLE VI-continued

Updating Baseline Correction (baseline enable = true on clock cycle i)
Stage 3 Clock Cycle i + m + 1

| UNIT | INPUTs | OUTPUT |
|---|---|---|
| SWITCH 3 | $B_k$  0 | $B_k$ |
| SWITCH 4 | TRUE  system clock | TRUE($k^{th}$ clock pulse for base line measurement) |
| FIFO 6 | $B_k$ | $B_{k-j}$ (clocked) |
| MATH UNIT 2 | $B_k$  $B_{k-j}$ | $[B_k - B_{k-j}]$ (clocked) |
| ACCUM 2 | $B_k - B_{k-j}$ | $S_k$ (clocked) |

$B_k$ = ($k^{th}$ baseline measurement) = $\Sigma_{n=i-2m-1,j-m-1}[ADC_n]$
$S_k$ = (sum of j baseline measurements) = $\Sigma_{n=k-j,k}[B_n]$

TABLE VII

Updating Baseline Correction (baseline enable = true on clock cycle i)
Stage 5 Clock Cycle i+m+3

| UNIT | INPUTs | OUTPUT |
|---|---|---|
| Latch 1 | FALSE | TRUE |
| SWITCH 1 | $ADC_{i-m}$  0 | 0 |
| SWITCH 2 | 0 | $S_k/j$ | 0 |
| MATH UNIT 1 | $ADC_i$ | 0 | $ADC_i$ |
| ACCUM 1 | $ADC_i$ |  | 0 (reset) |
| FIFO 3 | FALSE |  | FALSE |
| FIFO 4 | FALSE |  | TRUE |
| FIFO 5 | TRUE |  | FALSE |

TABLE VIII

Updating Baseline Correction (baseline enable = true on clock cycle i)
Stage 5 Clock Cycle i+m+3

| UNIT | INPUTs | OUTPUT |
|---|---|---|
| Latch 1 | FALSE |  | TRUE |
| SWITCH 1 | $ADC_{i-m+1}$ | $S_k/j$ | $S_k/j$ |
| SWITCH 2 | 0 | $S_k/j$ | $S_k/j$ |
| MATH UNIT 1 | $ADC_{i+1}$ | $S_k/j$ | $[ADC_{i+1} - S_k/j]$ |
| ACCUM 1 | $[ADC_{i+1} - S_k/j]$ |  | $[ADC_{i+1} - S_k/j]$ |
| FIFO 3 | FALSE |  | FALSE |
| FIFO 4 | FALSE |  | FALSE |
| FIFO 5 | FALSE |  | TRUE |

TABLE IX

Updating Baseline Correction (baseline enable = true on clock cycle i)
Stage 6 Clock Cycle 1 (for 1 between i + m + 4 and i + 2m + 3)

| UNIT | INPUTs | OUTPUT |
|---|---|---|
| Latch 1 | FALSE |  | TRUE |
| SWITCH 1 | $ADC_{1-2m-2}$ | 0 | 0 |
| SWITCH 2 | 0 | $S_k/j$ | 0 |
| MATH UNIT 1 | $ADC_{1-m-2}$ | 0 | $ADC_{1-m-2}$ |
| ACCUM 1 | $ADC_{1-m-2}$ |  | $\Sigma_{n=1+1,1-m-2}[ADC_n] - S_k/j$ |
| FIFO 3 | FALSE |  | FALSE |
| FIFO 4 | FALSE |  | FALSE |
| FIFO 5 | FALSE |  | FALSE |

On clock cycle i+2m+3, the output of ACCUM 1 will be $I_{i+m+1} = \Sigma_{n=i+1,i+m+1}[ADC_n] - S_k/j$. On clock cycle i+2m+4, the latch 1 output becomes FALSE, switch 1 is set to input A, and the circuit returns to the normal mode.

At low count rates, the accuracy of the measurement of the energy in the signal from a gamma camera depends on the length of time the signal is integrated. At higher count rates, an error in the measurement can occur if another event occurs during the integration of the signal from the first event. In accordance with one embodiment of the present invention, the outputs from sliding boxcar integrator 54 are combined to form the results from multiple integration times, and outputs the value from the longest integration time that does not contain a contribution from a later event.

Figure 6:
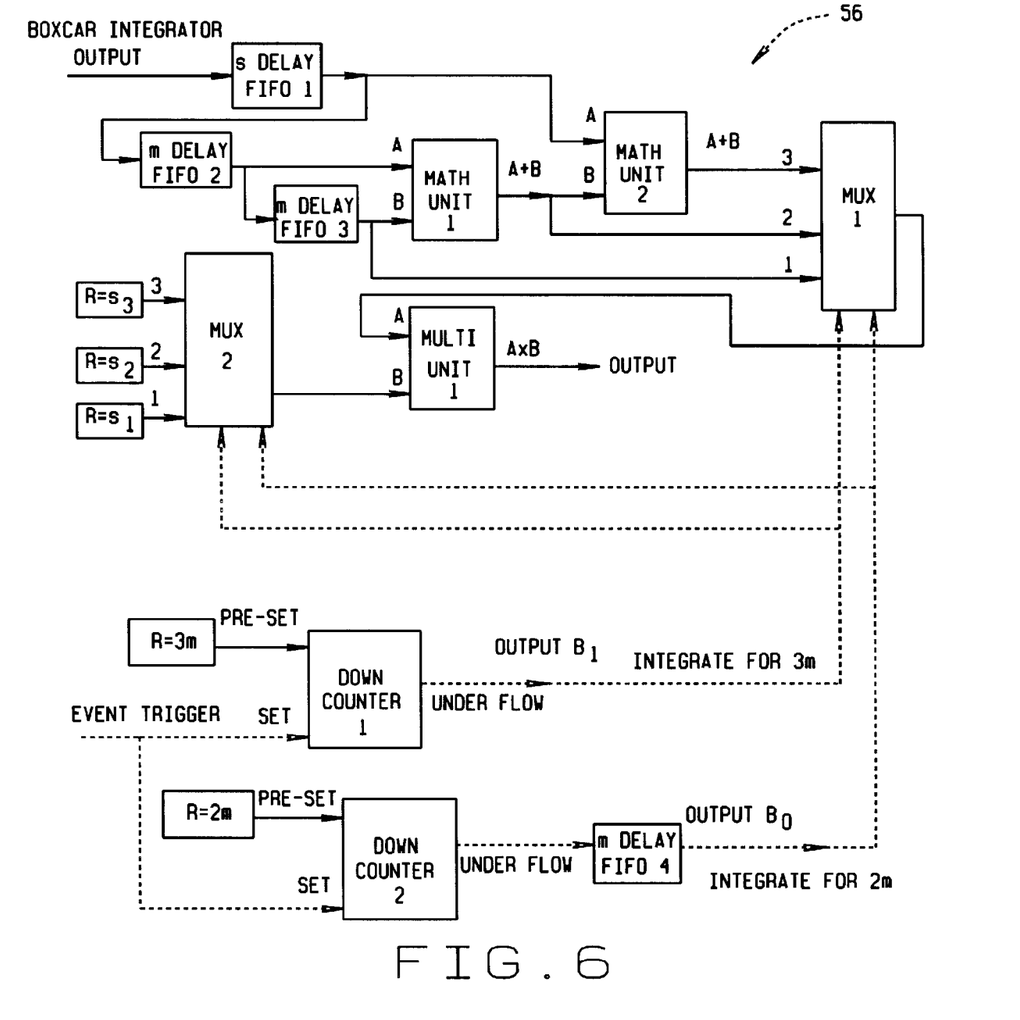
FIG. 6 is a block diagram of a circuit which forms signals of multiple integration times from the output of a sliding boxcar integrator.

FIG. 6 is a block diagram of one embodiment of circuit 56 which forms signals of multiple integration times from the output of sliding boxcar integrator 54. Circuit 56 is configured for 3 different integration times but can easily be modified to work for any number of different integration times. Circuit 56 generally includes a top portion which forms the results for multiple integration times, and a bottom portion which generates control signals for MUXs to select which of the results to output based on when the next event occurs in the detector.

The top portion of circuit 56 including math units 1 and 2, multiplier 1, FIFOs 1, 2, and 3, and MUXs 1 and 2. FIFO 1 is used to 'sync up' the event trigger pulse and the output of box car integrator 54. The delay length (S) depends on the propagation delays through boxcar integrator 54 and the event detection circuit. For example, consider an event whose signals leading edge is sampled at ADC 52 on the $i^{th}$ clock cycle. S is chosen such that if the event trigger arrives at circuit 56 on the $t^{th}$ clock cycle, the integral $I_{i+3m}=\Sigma_{n=i+2m,i+3m}[ADC_n]$—(baseline correction) will be at the output of FIFO 1 on clock cycle (t+3m+1).

As explained above, the bottom portion of circuit 56 generates control signals for MUXs 1 and 2 to select which of the results to output based on when the next event occurs in the detector. The bottom portion of circuit 56 includes down counters 1 and 2, and FIFO 4. The outputs of down counters 1 and 2 are supplied to MUXs 1 and 2.

TABLE X

MUX control on clock cycle t + 3m + 1
(event trigger pulse reaches circuit on clock cycle t)

| state | $B_0$ FIFO 4 output | $B_1$ Counter 1 output | Selected input of MUXs 1 and 2 |
|---|---|---|---|
| no event pulses between clock cycle t + 1 and t + 3m + 1 | TRUE | TRUE | 3 |
| no event pulses between clock cycle t + 1 and t + 2m + 1 but an event pulse occurred between t + 2m + 2 and t + 3m | TRUE | FALSE | 2 |
| an event pulse occurred between t + 1 and t + 2m + 1 | FALSE | FALSE | 1 |

TABLE XI

Multiple Integration Circuit on Clock Cycle t + 3m + 1
(event trigger pulse reaches circuit on clock cycle t)

| UNIT | INPUT | | | OUTPUT |
|---|---|---|---|---|
| FIFO 1 | $I^{i+3m+s}$ | | | $I_{i+3m}$ |
| FIFO 2 | $I_{i+3m}$ | | | $I_{i+2m}$ |
| FIFO 3 | $I_{i+2m}$ | | | $I_{i+m} = M_1(i)$ |
| MATH UNIT 1 | $I_{i+2m}$ | $I_{i+m}$ | | $[I_{i+m} + I_{i+2m}] = M_2(i)$ |
| MATH UNIT 2 | $I_{i+3m}$ | $M_2(i)$ | | $[I_{i+m} + I_{i+2m} + I_{i+2m}] = M_3(i)$ |
| MUX 1 | $M_1(i)$ | $M_2(i)$ | $M_3(i)$ | Mb(i) (b determined by $B_0$ and $B_1$) |
| MUX 2 | $S_1$ | $S_2$ | $S_3$ | Sb (b determined by $B_0$ and $B_1$) |
| Multiplier 1 | $M_b(i)$ | $S_b$ | | Mb(i) * Sb |

The function of circuit 56 is described in Tables X and XI. For example, consider an event whose event trigger reaches the circuit on clock cycle "t", then circuit 56 will be in the state shown in Table X and Table XI on clock cycle (t+3m+1). Note that $\{M_b(i)=\Sigma_{n=i,i+bm}[ADC_n]-b^*$ (baseline correction)$\}$ is the sliding box car integral of an event with its leading edge sampled by the ADC on the $i^{th}$ clock cycle and integrated for b*m samples. $S_b$ is chosen such that the output of the circuit is independent of the integration time. That is, for an event with a leading edge sampled on the $i^{th}$ clock cycle:

$$M_1(i)*S_1=M_2(i)*S_2=M_3(i)*S_3.$$

Using the integral value of an event to correct for the pileup of this event with a later event has been used in many gamma cameras. Such function is usually performed by using multiple integrators on a signal. When an event occurs, it is integrated into an integrator and the result saved. When the next event occurs, it is integrated into a second integrator. Pile up in the second event from the first is corrected for by scaling the first integrator value by exp $(-\lambda t)$ where $\lambda$ is the decay constant of the crystal and t is the time between events.

The multiple integrator configuration has at least three disadvantages. First, it requires multiple integrators. Second, if the signal from a PMT in ZONE A is to be corrected for pile up from events that occurred in ZONE B, the integrator must be triggered on events from ZONE B (not just events from ZONE A) and this can increase the dead time of the circuit. Third, it only corrects for events that are large enough to trigger the integrator.

Figure 7:
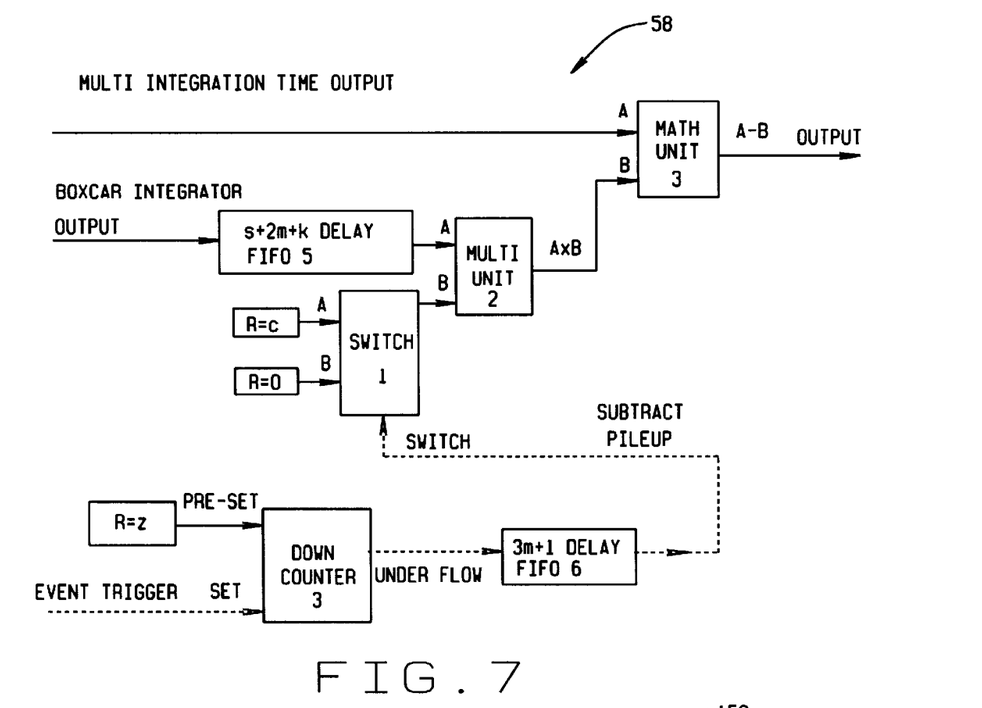
FIG. 7 is a block diagram of a pileup correction circuit.

Using a sliding boxcar integrator, however, pileup from previous pulses can be corrected and the known disadvantages can be avoided. FIG. 7 is a block diagram of pileup correction circuit 58 for box car integrator 54. The upper portion of circuit 58 performs the pileup correction, and the bottom portion of circuit 58 is optional and functions to turn off the corrections if no events have occurred for Z clock cycles before the event of interest. The bottom portion of circuit 58 includes down counters 3 and FIFO 6. As an input to down counter 3, Z should be chosen such that the contribution of an event Z clocks before the start of an integration is smaller than the noise added to the integration from the pileup correction. The actual size of Z depends on the electronic and photon background noise (photons from long decay states in the crystal).

The upper portion of circuit 58 performs the pileup correction and includes math unit 3, multi unit 2, switch 1 and FIFO 5.

TABLE XII

Pileup Correction Circuit on Clock Cycle t + 3m + 1
(event trigger pulse reaches circuit on clock cycle t)

| UNIT | INPUT | | OUTPUT |
|---|---|---|---|
| FIFO 5 | $I_{i+3m+s}$ | | $I_{i+m-k} = M_{1(i-k)}$ |
| Multiplier 2 | $M_1(i-k)$ | C | $C * M_1(i-k)$ |
| MATH UNIT 3 | $S_b * M_b(i)$ | $C * M_1(i-k)$ | $S_b * M_b(i) - C * M_1(i-k)$ |

Table XII shows the state of the circuit when an event trigger pulse occurs on clock cycle t. The measurement used to make the pileup correction is started k clock cycles before the start of the event. The variable k is chosen such that (k-m)*(clock period) is greater than the rise time of the signal. The value of C depends on m, k, and the shape of the signal pulse. C is chosen such that $C*[1-\exp(-\lambda mT)]= S_3*\exp(-\lambda kT)*[1-\exp(-3\lambda mT)]$ where T is the clock period. For most values of m and k, $[1-\exp(-\lambda mT)]$ will be greater than $\exp(-\lambda kT)*[1-\exp(-3\lambda mT)]$. The scale factor C can then be combined with the $S_b$'s and multiplier 2 can be eliminated.

Figure 8:
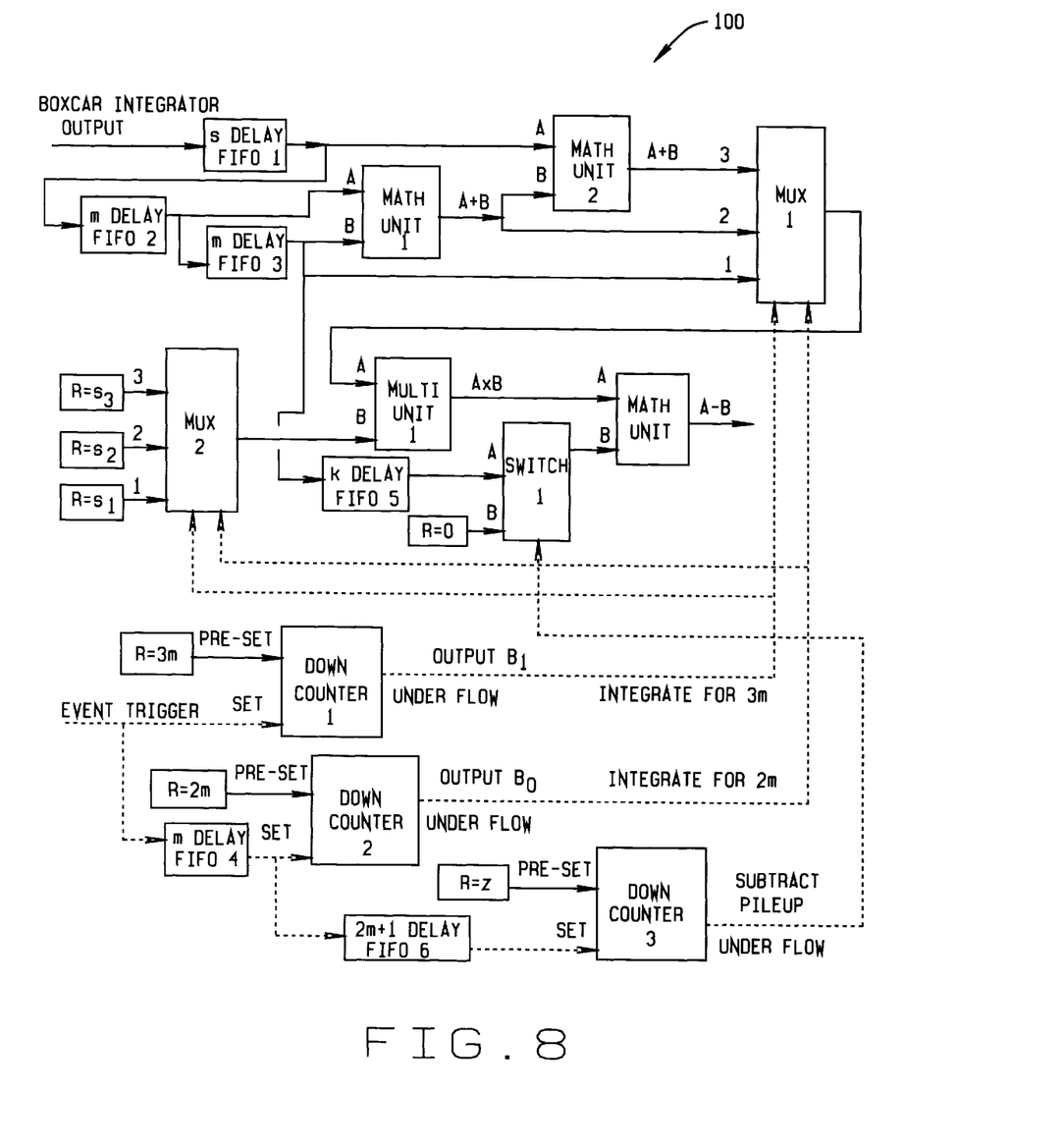
FIG. 8 illustrates a circuit which enables both multiple integration times and pileup correction.

FIG. 8 illustrates a circuit 100 which enables multiple integration times and pileup correction. To simplify the description, the multiple integration time and pile up correction circuits were shown as two circuits (i.e., circuits 56 and 58) in the previous figures. The variables k and m are chosen such that the multiplier in the pileup correction circuit can be eliminated, and circuits 56 and 58 are combined to reduce the sizes of the FIFOs.

The output of circuit 100 may have a timing error between the start of an event and the first digital sample in the integral. The error is from three main sources: jitter on the trigger circuit, an error between the propagation delays of the trigger and the signal, and jitter due to the asynchronous signal being synchronously sampled by ADC 52 (the jitter will be uniform over a clock period). Since the timing error causes different points on the signal waveform to be sampled, the value of the integral varies with the timing error.

Figure 9:
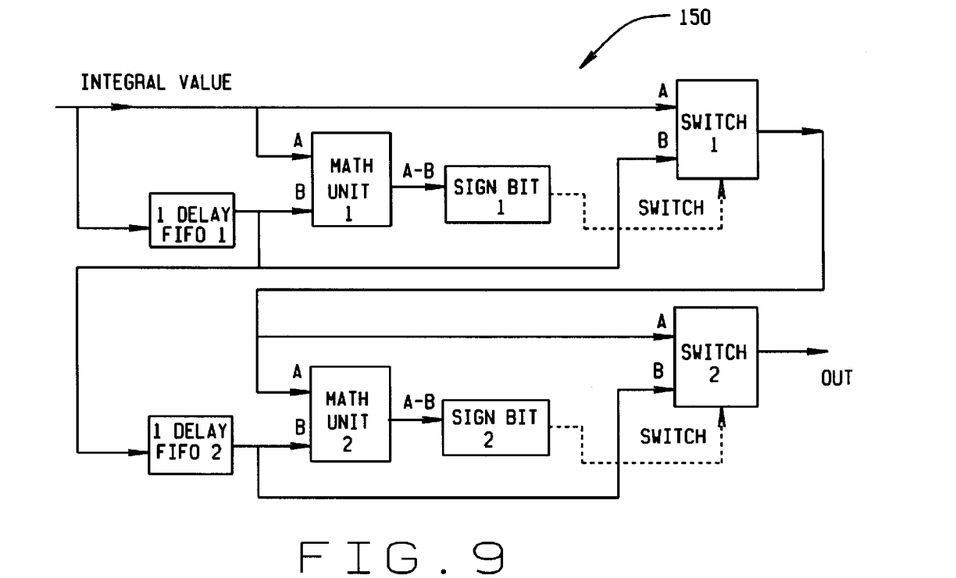
FIG. 9 is a block diagram of a circuit which corrects an integral value output for timing errors.

FIG. 9 is a block diagram of a circuit 150 which corrects the integral value output by circuit 100 for timing errors. Particularly, circuit 150 finds the maximum of the last three values, but it can easily be modified to give the maximum of any number of values. Tables XIII, XIV and XV describe the function of circuit 150.

TABLE XIII

Maximum of Three Circuit on Clock Cycle
(input for clock cycle i is the larger than those for clock cycles i−1 and i−2)

| UNIT | INPUT | | OUTPUT |
|---|---|---|---|
| FIFO 1 | $Input_i$ (input to the circuit) | | $Input_{i-1}$ |
| FIFO 2 | $Input_{i-1}$ | | $Input_{i-2}$ |
| MATH UNIT 1 | $Input_i$ | $Input_{i-1}$ | [$Input_i - Input_{i-1}$] |
| SIGN BIT UNIT 1 | [$Input_i - Input_{i-1}$] | | FALSE |
| SWITCH 1 | $Input_i$ | $Input_{i-1}$ | $Input_i$ |
| MATH UNIT | $Input_i$ | $Input_{i-2}$ | [$Input_i - Input_{i-2}$] |
| SIGN BIT UNIT 2 | [$Input_i - Input_{i-2}$] | | FALSE |
| SWITCH | Input | $Input_{i-2}$ | $Input_i$ (output of the circuit) |

TABLE XIV

Maximum of Three Circuit on Clock Cycle
(input for clock cycle i−1 is the larger than those for clock cycles i and i−2)

| UNIT | INPUT | | OUTPUT |
|---|---|---|---|
| FIFO 1 | $Input_i$ (input to the circuit) | | $Input_{i-1}$ |
| FIFO 2 | $Input_{i-1}$ | | $Input_{i-2}$ |
| MATH UNIT 1 | $Input_i$ | $Input_{i-1}$ | [$Input_i - Input_{i-1}$] |
| SIGN BIT UNIT 1 | [$Input_i - Input_{i-1}$] | | TRUE |
| SWITCH 1 | $Input_i$ | $Input_{i-1}$ | $Input_{i-1}$ |
| MATH UNIT | $Input_{i-1}$ | $Input_{i-2}$ | [$Input_{i-1} - Input_{i-2}$] |
| SIGN BIT UNIT 2 | [$Input_i - Input_{i-2}$] | | FALSE |
| SWITCH | $Input_{i-1}$ | $Input_{i-2}$ | $Input_{i-1}$ (output of the circuit) |

TABLE XV

Maximum of Three Circuit on Clock Cycle
(input for clock cycle i−2 is the larger than those for clock cycles i and i−1)

| UNIT | INPUT | | OUTPUT |
|---|---|---|---|
| FIFO 1 | $Input_i$ (input to the circuit) | | $Input_{i-1}$ |
| FIFO 2 | $Input_{i-1}$ | | $Input_{i-2}$ |
| MATH UNIT 1 | $Input_i$ | $Input_{i-1}$ | [$Input_i - Input_{i-1}$] |
| SIGN BIT UNIT 1 | [$Input_i - Input_{i-1}$] | | TRUE or FALSE |
| SWITCH 1 | $Input_i$ | $Input_{i-1}$ | X=maximum of ($Input_i$ and $Input_{i-1}$) |
| MATH UNIT | X | $Input_{i-2}$ | [X − $Input_{i-2}$] |
| SIGN BIT UNIT 2 | [X − $Input_{i-2}$] | | TRUE |
| SWITCH | X | $Input_{i-2}$ | $Input_{i-2}$ (output of the circuit) |

The above described anode signal processor provides many advantages over known processors. For example, the anode signal processor performs a sliding box car integration of each PMT anode signal, corrects for baseline shifts and pileup from the tails of previous events, varies the length of the box car based on the time between events, and uses a peak detection circuit to reduce the dependence of the integrated value on timing differences between the synchronous events and the synchronous ADC conversion. The outputs of anode processors are combined to provide the X and Y coordinates, and the energy E, of an event. The outputs from each head processor are then combined in a coincidence processor to provide the corrected positions and energies of coincidence events. The above described detector heads function at a high count rate with minimum dead time and pileup.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An anode signal processor for integrating signals from a nuclear camera including a photomultiplier tube having anodes, said anode signal processor comprising:
   a sliding box car integrator for integrating signals from the anodes; and
   a pileup correction circuit coupled to an output of said box car integrator.

2. An anode signal processor in accordance with claim 1 wherein said sliding box car integrator comprises a baseline restoration circuit.

3. An anode signal processor in accordance with claim 1 further comprising a shaping filter and an analog to digital converter, said shaping filter having an output coupled to an input of said analog to digital converter, and said analog to digital converter having an output coupled to said box car integrator.

4. An anode signal processor in accordance with claim 1 further comprising a variable integration circuit coupled to an output of said box car integrator.

5. An anode signal processor in accordance with claim 1 further comprising a peak latching circuit coupled to an output of said pileup correction circuit.

6. An anode signal processor in accordance with claim 5 further comprising a first in first out logic circuit coupled to an output of said peak latching circuit, said logic circuit coupled to receive an event select signal.

7. An anode signal processor in accordance with claim 1 further comprising a variable integration circuit, said variable integration circuit and said pileup correction circuit coupled to an output of said box car integrator.

8. An anode signal processor in accordance with claim 7 wherein said variable integration circuit and said pileup correction circuit are coupled to an event trigger.

9. An anode signal processor in accordance with claim 7 further comprising a peak latching circuit coupled to an output of said pileup correction circuit, and a first in first out logic circuit coupled to an output of said peak latching circuit, said logic circuit coupled to receive an event select signal.

10. An anode signal processor in accordance with claim 1, wherein said sliding box car integrator is configured to operate in first and second modes of operations, said first mode of operation being a normal mode in which an input signal is integrated using a box car method of integration, said second mode of operation comprising a baseline sampling mode in which a baseline correction is updated.

11. An anode signal processor in accordance with claim 10, wherein said sliding box car integrator further comprises a baseline restoration circuit.

12. An anode signal processor in accordance with claim 10, wherein said sliding box car integrator further comprising a first portion for performing integration and a second portion for generating a running average of the baseline.

13. An anode signal processor in accordance with claim 10 wherein said box car integrator is further configured to operate in a third mode of operation, said third mode of operation being an initialization mode wherein components of said box car integrator are initialized.

14. An anode signal processor in accordance with claim 13 wherein said sliding box car integrator further comprises a baseline restoration circuit.

15. Apparatus for use in connection with a nuclear camera, said apparatus comprising:
    a digital integrator configured to perform a sliding box car integration; and
    a pileup correction circuit coupled to an output of said digital integrator.

16. Apparatus in accordance with claim 15 where said digital integrator further comprises a baseline restore circuit.

17. Apparatus in accordance with claim 15 further comprising a variable integration circuit wherein outputs from said digital integrator are combined to provide multiple integration times.

18. Apparatus in accordance with claim 15 wherein said pileup correction circuit uses an output from said digital integrator to correct an integral value for pileup from earlier events.

19. Apparatus in accordance with claim 18 wherein said pileup correction circuit performs no correction if the pileup from earlier events is below a predetermined threshold.

20. Apparatus in accordance with claim 15 wherein said digital integrator operates in first and second modes of operation, said first mode of operation being a normal mode in which an input signal is integrated using a box car method of integration, said second mode of operation comprising a baseline sampling mode in which a baseline correction is updated.

21. Apparatus in accordance with claim 20 wherein said digital integrator further operates in a third mode of operation, said third mode of operation being an initialization mode wherein components of said integrator are initialized.

22. Apparatus in accordance with claim 15 further comprising a variable integration circuit which forms signals of multiple integration times from the output of said digital integrator, said variable integration circuit configured for multiple integration times.

23. Apparatus in accordance with claim 22 wherein said variable integration circuit comprises a first circuit portion which forms the results for multiple integration times, and a second portion which generates control signals used to select which of the results to output.

24. Apparatus in accordance with claim 15 wherein said pileup correction circuit comprises a first portion which performs pileup correction.

25. Apparatus in accordance with claim 24 wherein said pileup correction circuit further comprises a second portion which prevents any correction from being made if no events occur for a preselected number of clock cycles before an event of interest.

26. Apparatus for use in connection with a nuclear camera, said apparatus comprising a digital integrator configured to perform a sliding box car integration where an error in said digital integrator due to a time difference between analog to digital sampling and a start of a signal to be integrated is reduced by using a maximum of integrated values near an integrated value selected at a trigger.

27. Apparatus in accordance with claim 26 wherein a maximum of the last N outputs from said integrator is selected as an integrator output.

28. A method for processing signals received from an anode of a photomultiplier tube in a nuclear detector, said method comprising the steps of:
    converting the signal from an analog signal to a digital signal;
    performing a sliding box car integration on the digital signal; and
    performing peak latching.

29. A method in accordance with claim 28 further comprising performing a baseline restoration on the digital signal.

30. A method in accordance with claim 28 further comprising the step of filtering the signal from the anode prior to converting the signal to a digital signal.

31. A method in accordance with claim 28 further comprising the step of combining the outputs from integrating to provide multiple integration times.

32. Apparatus for use in connection with a nuclear camera, said apparatus comprising a digital integrator configured to perform a sliding box car integration and a peak latching circuit.

33. A method for processing signals received from an anode of a photomultiplier tube in a nuclear detector, said method comprising the steps of:
    converting the signal from an analog signal to a digital signal;
    performing a sliding box car integration on the digital signal; and
    performing a pileup correction.

34. A method in accordance with claim 33 further comprising the step of performing peak latching.

35. Apparatus for use in connection with a nuclear camera, said apparatus comprising:
    a digital integrator configured to perform a sliding box car integration;

a variable integration circuit wherein outputs from said digital integrator are combined to provide multiple integration times; and wherein a value from a longest integration time for which there is no pileup with a later event is selected.

36. A method for processing signals received from an anode of a photomultiplier tube in a nuclear detector, said method comprising the steps of:

converting the signal from an analog signal to a digital signal;

performing a sliding box car integration on the digital signal using a box car integrator;

combining a plurality of outputs from the box car integrator to provide multiple integration times; and selecting a value from a longest integration time for which there is no pileup with later events.

* * * * *

UNITED STATES PATENT AND TRADEMARK OFFICE
CERTIFICATE OF CORRECTION

PATENT NO. : 6,252,232 B1
DATED : June 26, 2001
INVENTOR(S) : McDaniel et al.

It is certified that error appears in the above-identified patent and that said Letters Patent is hereby corrected as shown below:

Column 5,
Table II, Unit ACCUM 1, OUTPUT column, after "(baseline correction stored in ACCUM 1)" insert a minus sign -- - --.

Column 8,
Table VI, line 13, after the comma, delete "j-m-1" and insert therefor -- i-m-1 --.
Table VII, Unit SWITCH 2, INPUTS column, delete "$S_{k/j}$" and insert therefor -- $S_k/_j$ --.
Table VIII, Unit SWITCH 1, OUTPUT column, delete "$S_k/j$" and insert therefor -- $S_{k/j}$ --.
Table VIII, Unit SWITCH 2, OUTPUT column, delete "$S_k/j$" and insert therefor -- $S_{k/j}$ --.
Table VIII, Unit MATH UNIT 1, OUTPUT column, delete "$_{sk}/j]$" and insert therefor -- $S_k/j]$ --.
Table VIII, Unit ACCUM 1, INPUTS column, delete "$_{sk}/j]$" and insert therefor -- $S_k/j]$ --.
Table VIII, Unit ACCUM 1, OUTPUT column, delete "$_{sk}/j]$" and insert therefor -- $S_k/j]$ --.

Column 9,
Table XI, Unit FIFO 1, INPUT column, delete "$I^{i+3m+s}$" and insert therefor -- $I_{i+3m+s}$ --.
Table XI, Unit MATH UNIT 2, OUTPUT column, delete "$I_{i+2m}]$" and insert therefor -- $I_{i+3m}]$ --.
Table XI, Unit MUX 1, OUTPUT column, delete "Mb(i)" and insert therefor -- $M_b(i)$ --.
Table XI, Unit MUX 2, OUTPUT column, delete "Sb" and insert therefor -- $S_b$ --.
Table XI, Unit Multiplier 1, OUTPUT column, delete "Mb(i) * Sb" and insert therefor -- $M_b(i) * S_b$ --.

Column 11,
Table XIII, in the header, after "Clock Cycle" insert -- i --.
Table XIII, in the 2nd line of the header, delete "the larger" and insert therefor -- larger --.
Table XIII, Unit SWITCH, INPUT column, delete "Input" and insert therefor -- $Input_i$ --.
Table XIV, in the header, after "Clock Cycle" insert -- i --.
Table XIV, in the 2nd line of the header, delete "the larger" and insert therefor -- larger --.

UNITED STATES PATENT AND TRADEMARK OFFICE
CERTIFICATE OF CORRECTION

PATENT NO.    : 6,252,232 B1
DATED         : June 26, 2001
INVENTOR(S)   : McDaniel et al.

It is certified that error appears in the above-identified patent and that said Letters Patent is hereby corrected as shown below:

<u>Column 12,</u>
Table XV, in the header, after "Clock Cycle" insert -- i --.
Table XV, in the 2$^{nd}$ line of the header, delete "the larger" and insert therefor -- larger --.

Signed and Sealed this

Twenty-fourth Day of June, 2003

JAMES E. ROGAN
*Director of the United States Patent and Trademark Office*